United States Patent
Sohn et al.

(10) Patent No.: US 10,808,292 B2
(45) Date of Patent: Oct. 20, 2020

(54) METHOD OF MANUFACTURING HOT PRESS FORMED PARTS HAVING EXCELLENT POWDERING RESISTANCE

(71) Applicant: POSCO, Pohang-si (KR)

(72) Inventors: Il-Ryoung Sohn, Gwangyang-si (KR); Dae-Chul Bae, Pohang-si (KR); Heung-Yun Kim, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 15/944,128

(22) Filed: Apr. 3, 2018

(65) Prior Publication Data

US 2018/0223387 A1    Aug. 9, 2018

Related U.S. Application Data

(60) Division of application No. 15/250,120, filed on Aug. 29, 2016, now Pat. No. 9,963,758, which is a
(Continued)

(30) Foreign Application Priority Data

Dec. 24, 2014 (KR) .................. 10-2014-0189096

(51) Int. Cl.
  *C21D 9/46* (2006.01)
  *C23C 2/12* (2006.01)
  (Continued)

(52) U.S. Cl.
  CPC .............. *C21D 9/46* (2013.01); *B32B 15/012* (2013.01); *C21D 8/0226* (2013.01);
  (Continued)

(58) Field of Classification Search
  CPC .............. C21D 9/46; C22F 1/043; C23C 2/12
  (Continued)

(56) References Cited

U.S. PATENT DOCUMENTS 6,296,805 B1   10/2001  Laurent et al.
2008/0286603 A1*  11/2008  Oh .................. C22C 38/001
                                                428/684
(Continued)

FOREIGN PATENT DOCUMENTS

CN      102348824      2/2012
EP       2377965      10/2011
(Continued)

OTHER PUBLICATIONS

European Search Report—European Application No. 15873407.9, dated Oct. 2, 2017, citing EP 2 377 965, JP 2007 314874, JP 2010 018856 and JP 2010 018860.
(Continued)

*Primary Examiner* — Weiping Zhu
(74) *Attorney, Agent, or Firm* — Cantor Colburn LLP

(57) ABSTRACT

Provided is a method of manufacturing an HPF part comprising: preparing a steel sheet comprising C: 0.18% to 0.25%, Si: 0.1% to 1.0%, Mn: 0.9% to 1.5%, P: 0.03% or less, S: 0.01% or less, Al: 0.01% to 0.05%, Cr: 0.05% to 0.5%, Ti: 0.01% to 0.05%, B: 0.001% to 0.005%, N: 0.009% or less, and a balance of Fe and impurities; heating the steel sheet at 550° C. to 850° C. followed by maintaining at 640° C. to 680° C., and immersing the steel sheet in a hot dip aluminum plating bath, and a balance of Al and impurities; cooling the plated steel sheet at 15° C./s or faster; heating the cooled hot dip aluminum plated steel sheet at 880° C. to 930° C. followed by maintaining for a certain time; and hot forming the alloyed hot dip aluminum plated steel sheet and quenching at a range of 300° C. or lower at the same time.

9 Claims, 1 Drawing Sheet

Related U.S. Application Data continuation of application No. PCT/KR2015/004321, filed on Apr. 29, 2015.

(51) Int. Cl.
| | |
|---|---|
| *C22C 38/28* | (2006.01) |
| *B32B 15/01* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/32* | (2006.01) |
| *C22F 1/043* | (2006.01) |
| *C23C 2/28* | (2006.01) |
| *C23C 2/40* | (2006.01) |

(52) U.S. Cl.
CPC .......... *C21D 8/0236* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C22F 1/043* (2013.01); *C23C 2/12* (2013.01); *C23C 2/285* (2013.01); *C23C 2/40* (2013.01); *Y10T 428/1275* (2015.01); *Y10T 428/12757* (2015.01); *Y10T 428/12764* (2015.01); *Y10T 428/12972* (2015.01); *Y10T 428/12979* (2015.01); *Y10T 428/2495* (2015.01); *Y10T 428/24967* (2015.01); *Y10T 428/263* (2015.01); *Y10T 428/264* (2015.01); *Y10T 428/265* (2015.01)

(58) Field of Classification Search
USPC .......................................................... 148/531
See application file for complete search history.

(56) References Cited

U.S. PATENT DOCUMENTS

| | | | |
|---|---|---|---|
| 2011/0300407 A1* | 12/2011 | Cho | ............ C23C 2/02 428/653 |
| 2014/0009366 A1 | 1/2014 | Chang | |
| 2014/0030544 A1 | 1/2014 | Maki et al. | |

FOREIGN PATENT DOCUMENTS

| | | |
|---|---|---|
| JP | 2005097725 | 4/2005 |
| JP | 2006037130 | 2/2006 |
| JP | 2007314874 | 12/2007 |
| JP | 2010018856 | 1/2010 |
| JP | 2010018860 | 1/2010 |
| KR | 1020070087240 | 8/2007 |
| KR | 1020130132623 | 12/2013 |
| WO | 02103073 | 12/2002 |
| WO | 2012137687 | 10/2012 |

OTHER PUBLICATIONS

International Search Report—PCT/KR2015/004321 dated Sep. 8, 2015.
Chinese Office Action—Chinese Application No. 201810778626.3 dated Jan. 3, 2020, citing CN103492605, EP2377965, JP2010-18856, and Cooling Rate of Steel Wire.
Cooling Rate of Steel Wire.

* cited by examiner

METHOD OF MANUFACTURING HOT PRESS FORMED PARTS HAVING EXCELLENT POWDERING RESISTANCE

TECHNICAL FIELD

The present disclosure relates to manufacturing a Hot Press Forming (HPF) part having an aluminum plated layer on the surface thereof, and more specifically, to an HPF part having excellent powdering resistance during press forming by minimizing destruction and powdering of a plated layer during hot press forming, and a method of manufacturing the same.

BACKGROUND ART

An aluminum plated steel sheet for Hot Press Forming (HPF) is generally prepared by immersing a steel sheet having a high degree of hardenability in a plating bath containing a plating solution based on Al for plating, and then the plated steel sheet having an Al plated layer on the surface thereof is hot pressed. Such a steel sheet is widely used in the manufacturing of vehicle parts having complicated shapes and strengths of 1300 MPa or higher.

However, in the HPF heating process, the plated layer is composed of an alloyed layer comprising an intermetallic compound consisting of FeAl or $Fe_2A_{15}$ and the like as an upper layer, and a diffusion layer consisting of Fe 80% to 95 wt % (hereinafter all steel ingredients are in wt %) as a lower layer. However, because the alloyed layer formed uppermost in the plated layer has brittleness as compared to the diffusion layer, the alloyed layer may be detached from the plated layer during hot press forming and may be attached to a pressing side. Therefore, this disadvantage makes continuous hot press forming difficult.

Namely, if the Al plated material is hot press formed by heating thereof in a heating furnace at a temperature of 900° C. to 930° C., the plated layer may be detached from a region of high surface friction, and at this time, an overall alloyed layer or a portion thereof may be detached from the region of high surface friction, and therefore, there may be a problem in that the detached plated layer may be attached to the surface of a hot press forming mold.

Thus, the development of an HPF part which can overcome the above-mentioned problems and have excellent press formability is required.

SUMMARY OF THE INVENTION

An aspect of the present disclosure is directed to providing an HPF part, which can minimize the problem that a plated layer is detached from a plating object and attached to the surface of a mold during hot press forming by optimizing thickness of an alloyed layer, and a percentage of a tau phase and contents of Si and Cr in a plated layer.

Further, an aspect of the present disclosure is directed to provide a method of manufacturing the HPF part.

However, problems sought to be resolved by the present disclosure are not limited to the above-described problems. Other problems, which are sought to be resolved by the present disclosure but are not described herein, can be clearly understood by those skilled in the art from the descriptions below.

The present disclosure relates to, in an HPF part wherein a hot-dip plated layer comprising Al is formed on the surface of a base steel sheet, an HPF part having excellent powdering resistance during hot press forming, wherein the base steel sheet comprises C: 0.18% to 0.25%, Si: 0.1% to 1.0%, Mn: 0.9% to 1.5%, P: 0.03% or less, S: 0.01% or less, Al: 0.01% to 0.050, Cr: 0.05% to 0.5%, Ti: 0.01% to 0.05%, B: 0.001% to 0.005%, N: 0.009% or less, and a balance of Fe and other impurities by wt %;

the hot-dip plated layer consists of a soft diffusion layer and a hard alloyed layer;

in the alloyed layer, a tau phase exists at area within a range of 10% to 30%; and the tau phase is prepared by comprising Si of 10% or greater and Cr of 0.2% or greater by wt % thereof, so as to allow the alloyed layer to have a thickness of 35 μm or less.

The base steel sheet may be a cold rolled steel sheet or a hot rolled steel sheet.

The tau phase may preferably be prepared by comprising Si: 10% to 12%, Mn+Cr: 1.3% to 2.0%, and a balance of Fe and Al by wt % thereof.

In the hot-dip plated layer, a thickness ratio of the alloyed layer/diffusion layer may preferably satisfy 1.5 to 3.0.

The tau phase may preferably be formed on the boundary between the alloyed layer and the diffusion layer and inside the alloyed layer, and the tau phase formed inside the alloyed layer may preferably take the form of a band interconnected in 50% or longer of a zone perpendicular to the thickness of the plated layer.

The base steel sheet may preferably further comprise Mo+W: 0.001% to 0.5%.

Further, the base steel sheet may preferably further comprise at least one of Nb, Zr and V: within a range of 0.001% to 0.4% (as the sum).

Further, the base steel sheet may preferably further comprise Cu+Ni: within a range of 0.005% to 2.0%.

Moreover, the base steel sheet may preferably further comprise at least one of Sb, Sn, and Bi: 0.03% or less.

Further, the present disclosure relates to a method of manufacturing an HPF part having excellent powdering resistance during hot press forming, which comprises:

a process of preparing a steel sheet having a composition as described above;

a process of heating the steel sheet at a temperature of 550° C. to 850° C. followed by maintaining a temperature at 640° C. to 680° C., and then immersing the steel sheet in a hot dip aluminum plating bath prepared by comprising Si: 9% to 11%, Fe: 3% or less, and a balance of Al and other inevitable impurities by wt % for hot dip aluminum plating;

a process of heating the hot dip aluminum plated steel sheet at a temperature of 880° C. to 930° C. followed by being maintained for a certain time to alloy a hot dip aluminum plated layer of the surface thereof; and a process of hot forming the alloyed hot dip aluminum plated steel sheet and quenching at a temperature range of 300° C. or lower at the same time to manufacture an HPF part.

In the present disclosure, the plated steel sheet may preferably be cooled at an average cooling speed of 15° C./s or faster after the hot dip plating until the plated layer is solidified.

Further, in the present disclosure, the alloyed hot dip aluminum plated layer may preferably consist of a soft diffusion layer and a hard alloyed layer; in the alloyed layer, a tau phase may preferably exist at area % within a range of 10% to 30%; and the tau phase may preferably be prepared by comprising Si of 10% or greater and Cr of 0.2% or greater by wt % thereof, so as to allow the alloyed layer to have a thickness of 35 μm or less.

The steel sheet may be a cold rolled steel sheet or a hot rolled steel sheet.

The tau phase may preferably be prepared by comprising Si: 10% to 12%, Mn+Cr: 1.3% to 2.0%, and a balance of Fe and Al by wt % thereof.

In the hot dip aluminum plated layer, a thickness ratio of the alloyed layer/diffusion layer may preferably satisfy 1.5 to 3.0.

The tau phase may preferably be formed on the boundary between the alloyed layer and the diffusion layer and inside the alloyed layer, and the tau phase formed inside the alloyed layer may preferably take the form of a band interconnected in 50% or longer of a zone perpendicular to the thickness of the plated layer.

Further, the method may further comprise a process of cooling the alloyed hot dip aluminum plated steel sheet at a temperature range of 700° C. to 780° C. before hot forming the alloyed hot dip aluminum plated steel sheet.

At this time, a cooling speed thereof may preferably be controlled within a range of 20° C./s to 100° C./s.

Further, the present disclosure relates to a method of manufacturing an HPF part having excellent powdering resistance during hot press forming, which comprises:

a process of heating the hot dip aluminum plated steel sheet at a temperature of 880° C. to 930° C. followed by being maintained for a certain time to alloy a hot dip aluminum plated layer of the surface thereof; and a process of hot forming the alloyed hot dip aluminum plated steel sheet and quenching at a temperature range of 300° C. or lower at the same time to manufacture an HPF part.

Further, in the present disclosure, the alloyed hot dip aluminum plated layer may preferably consist of a soft diffusion layer and a hard alloyed layer; in the alloyed layer, a tau phase may preferably exist at area % within a range of 10% to 30%; and the tau phase may preferably be prepared by comprising Si of 10% or greater and Cr of 0.2% or greater by wt % thereof, so as to allow the alloyed layer to have a thickness of 35 μm or less.

The steel sheet may be a cold rolled steel sheet or a hot rolled steel sheet.

The tau phase may preferably be prepared by comprising Si: 10% to 12%, Mn+Cr: 1.3% to 2.0%, and a balance of Fe and Al by wt % thereof.

In the hot dip aluminum plated layer, a thickness ratio of the alloyed layer/diffusion layer may preferably satisfy 1.5 to 3.0.

The present disclosure has an effect of effectively providing an HPF part, which can minimize the problem that a plated layer is detached and attached on the surface of a mold during hot press forming by optimizing thickness of an alloyed layer making a hot dip aluminum plated layer, percentage, and composition of a tau phase in a plated layer and the like.

DETAILED DESCRIPTION OF THE INVENTION

Figure 1:
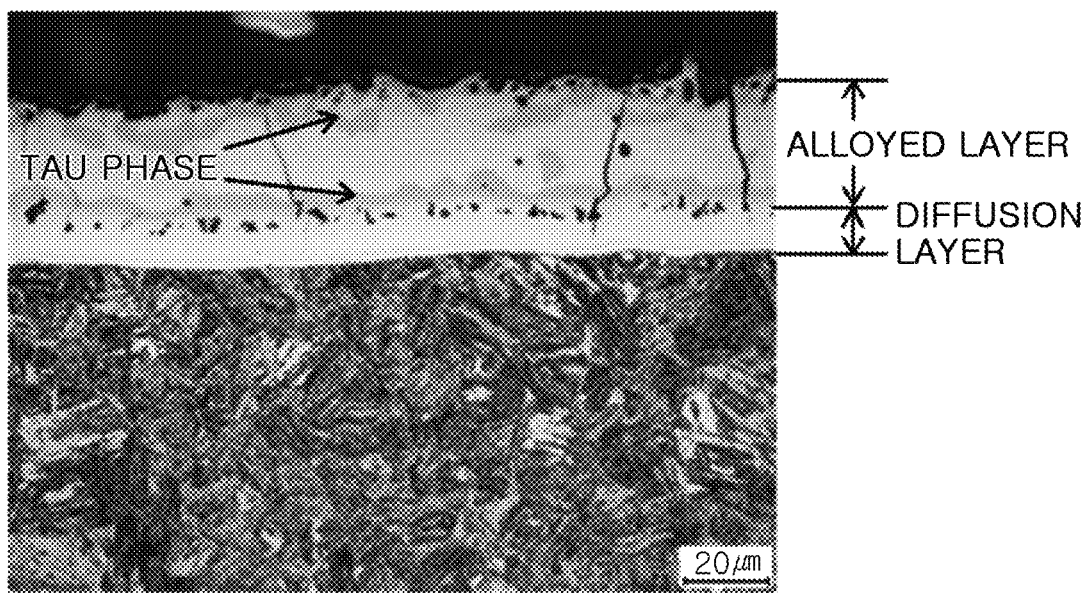
FIG. 1 is an image of a structure showing a cross section of a plated layer after hot pressing in an Example of the present disclosure.

Hereinafter, the present disclosure will be described.

In general, there is a problem in that when hot press forming a hot dip aluminum plated steel sheet, the plated layer is detached after hot pressing, and the plated layer is attached to the surface of a press mold thereby deteriorating press formability. The present inventors have repeated studies and experiments to solve these problems, and as a result, have looked for solutions to reduce thickness of the alloyed layer having brittleness in the hot dip aluminum plated layer to be as thin as possible. Moreover, the inventors found that thickness of the alloyed layer is closely related to area percentage and composition of a tau phase in the alloyed layer.

In describing in detail, in the alloyed layer, a tau phase that is a FeAl phase having a base, which consists of a $Fe_2A_{15}$ phase and has brittleness, and having softness is distributed. And in the lower part of the alloyed layer, a soft layer is formed on an interface with the base steel sheet.

The present inventors suggest the present disclosure after discovering that the composition (contents of Si and Cr) of the tau phase making the alloyed layer is important. In particular, when the tau phase contains Si of 10% or greater and Cr of 0.2% or greater by wt % thereof, the tau phase can be distributed so that a percentage of the tau phase in the whole alloyed layer is 10% or greater, and thickness of the alloyed layer is within 35 μm, thereby minimizing detachment of the plated layer during hot press forming. In other words, the present inventors suggests the present disclosure after discovering that after the HPF process, the percentage of the tau phase in the alloyed layer and the contents of Si and Cr in the tau phase affect press formability of the plated layer.

Hereinafter, the HPF part of the present disclosure having excellent powdering resistance during hot press forming will be described.

The HPF part of the present disclosure refers to a formed part manufactured by hot press forming a hot dip aluminum plated steel sheet wherein a hot dip aluminum plated layer is formed on the surface of a base steel sheet. In the present disclosure, the base steel sheet may be a common cold rolled steel sheet, but may also be a hot rolled steel sheet.

The base steel sheet making the HPF part is prepared by comprising C: 0.18% to 0.25%, Si: 0.1% to 1.0%, Mn: 0.9% to 1.5%, P: 0.03% or less, S: 0.01% or less, Al: 0.01% to 0.05%, Cr: 0.05% to 0.5%, Ti: 0.01% to 0.05%, B: 0.001% to 0.005%, N: 0.009% or less, and a balance of Fe and other impurities by wt %. Each ingredient of the base steel sheet and reasons for limiting thereof will be described in detail as follows.

C: 0.18% to 0.25%

C is an essential element increasing strength of martensite. If a C content is less than 0.18%, it may be difficult to obtain enough strength to secure impact resistance. Further, if the C content is greater than 0.25%, impact toughness of a slab may be deteriorated, and weldability of the HPF part may be deteriorated.

Considering that, in the present disclosure, it is preferable to limit the C content to 0.18 wt % to 0.25 wt % (hereinafter, just referred to as "%").

Si: 0.1% to 1.0%

Si is effective to uniformity of a steel material after the HPF, and may contribute to formation of the tau phase of the plated layer by diffusion to the plated layer during the HPF process. If the Si content is less than 0.1%, it may be difficult to obtain enough effect to uniformity of a material and diffusion to the plated layer, and if the Si content is greater than 1.0%, it may be difficult to secure good quality of the hot dip aluminum plated surface by Si oxides formed on the surface of the steel sheet during annealing. Therefore, the Si is added in an amount of 1.0% or less.

Mn: 0.9% to 1.5%

Mn is added to secure hardenability of a steel such as Cr, B, and the like. If a Mn content is less than 0.9%, it may be difficult to secure enough hardenability thereby forming bainite. Therefore, it may be difficult to secure enough strength. Further, it the Mn content is greater than 1.5%, a cost of manufacturing a steel sheet may increase, and also a bending property of the HPF part may be remarkably deteriorated as the Mn is segregated inside the steel material. Considering that, in the present disclosure, it is preferable to limit the Mn content within a range of 0.9% to 1.5%.

P: 0.03% or Less (not Including 0%)

P is a grain boundary segregation element hindering many characteristics of the HPF part. Thus, it is preferable to contain the P as small as possible. If the P content is greater than 0.03%, a bending property, an impact property, weldability, and the like of the formed part may be deteriorated. Thus, it is preferable to limit the upper limit of the content to 0.03%.

S: 0.01% or Less (not Including 0%)

S is an element existing in a steel as an impurity and hindering a bending property and weldability of the formed part. Thus, it is preferable to contain the S as small as possible. If the S content is greater than 0.01%, the bending property and weldability of the formed part may become worse. Thus, it is preferable to limit the upper limit of the content to 0.01%.

Al: 0.01% to 0.05%

Al is added for the purpose of deoxidation for steel making like the Si. In order to achieve the purpose, the Al is added in an amount of 0.01% or greater. If the content is greater than 0.05%, the effect may be saturated, and the surface quality of the plated material may become worse. Thus, it is preferable to limit the upper limit of the content to 0.05%.

Cr: 0.05% to 0.5%

Cr is added to secure hardenability of a steel such as Mn, B, and the like. If a Cr content is less than 0.05%, it may be difficult to secure enough hardenability, and if the content is greater than 0.5%, the hardenability can be sufficiently secured. But the characteristic may be saturated, and also a cost of manufacturing the steel may increase. Considering that, in the present disclosure, it is preferable to limit the Cr content to a range of 0.05% to 0.5%.

Ti: 0.01% to 0.05%

Ti is added to form TiN by being bound to a nitrogen remained in a steel as an impurity, thereby leaving solid B essential to secure hardenability. If a Ti content is less than 0.01%, it may be difficult to expect the sufficient effect, and if the content is greater than 0.05%, the characteristic may be saturated and a cost of manufacturing a steel may increase. Considering that, in the present disclosure, it is preferable to limit the Ti content to a range of 0.01% to 0.05%.

B: 0.001% to 0.005%

B is added to secure hardenability of the HPF part like Mn and Cr. To achieve the purpose, the B should be added in an amount of 0.001% or greater, and if the content is greater than 0.005%, the effect may be saturated, and also a hot rolling property may be remarkably reduced. Thus, in the present disclosure, it is preferable to limit the B content to a range of 0.001% to 0.005%.

N: 0.009% or Less

N exists in a steel as an impurity, and it is preferable to add as little N as possible. If a N content is greater than 0.009%, it may cause bad surface of a steel. Thus, it is preferable to limit the upper limit of the content to 0.009%.

Then, more preferably, the base steel sheet of the HPF part of the present disclosure may further contain the following ingredients.

Mo+W: 0.001% to 0.5%

Mo and W are elements reinforcing hardenability and precipitation, and are very effective to further secure high strength. If the sum of the amounts of the Mo and the W is less than 0.001%, it may be difficult to obtain a sufficient effect of reinforcing hardenability and precipitation, and if the content is greater than 0.5%, the effect may be saturated and also a manufacturing cost may increase. Thus, in the present disclosure, it is preferable to limit the Mo+W content to a range of 0.001% to 0.5%.

A sum of at least one of Nb, Zr, or V: 0.001% to 0.4%

Nb, Zr, and V are elements increasing strength of a steel sheet, and improving grain refinement and heat treatment characteristics. If a content of at least one of the Nb, Zr, and V is less than 0.001%, it may be difficult to expect the above effect, and if the content is greater than 0.4%, a manufacturing cost may excessively increase. Thus, in the present disclosure, it is preferable to limit the contents of the elements to a range of 0.001% to 0.4%.

Cu+Ni: 0.005% to 2.0%

Cu is an element improving strength by forming fine Cu precipitates, and Ni is an element effective to increase strength and improve heat treatment characteristics. If the sum of the above ingredients is less than 0.005%, it may difficult to obtain enough desired strength, and if the content is greater than 2.0%, workability may become worse, and a manufacturing cost may increase. Considering that, in the present disclosure, it is preferable to control the Cu+Ni content to a range of 0.005% to 2.0%.

At Least One of Sb, Sn, or Bi: 0.03% or Less

Sb, Sn, and Bi are grain segregation elements, and during the HPF process, the elements are concentrated on the interface between the plated layer and the base iron and can improve adhesion of the plated layer. The elements can play a role in preventing the detachment of the plated layer during hot forming by improving adhesion of the plated layer. Because Sb, Sn, and Bi have similar characteristics, it is possible to use the three elements as a mixture, and at this time, the sum of at least one may preferably be 0.03% or less. If the sum of the above ingredients is greater than 0.03%, there may be a problem that brittleness of the base iron may be deteriorated during the hot forming.

The HPF part of the present disclosure has a hot dip aluminum plated layer formed on the surface of the base steel sheet having the above mentioned composition, and as known, the plated layer consists of a soft diffusion layer and a hard alloyed layer. And the alloyed layer is composed of an $Fe_2Al_5$ base phase having brittleness and a tau phase (FeAl) having softness. At this time, in the present disclosure, the tau phase is formed on the boundary between the alloyed layer and the diffusion layer and inside the alloyed layer, and the tau phase formed inside the alloyed layer may preferably take the form of a band interconnected in 50% or longer of a zone perpendicular to the thickness of the plated layer.

In the present disclosure, in the alloyed layer, the tau phase (FeAl) may preferably exist in a range of 10% to 30% by area %. If the area percentage of the tau phase is less than 10%, the plated layer may often detach during press processing because the plated layer is mechanically brittle, and if the percentage is greater than 30%, weldability may become worse.

Further, in the present disclosure, the tau phase may preferably be prepared by comprising Si of 10% or greater and Cr of 0.2% or greater (remaining ingredients are Al and Fe) by wt % thereof. By controlling the ingredients of the tau phase as described above, it is possible to control thickness of the alloyed layer having brittleness to be 35 µm or less and also the area percentage of the tau phase can be controlled. Thus, the HPF part having excellent powdering resistance during hot press forming can be provided.

More preferably, the tau phase may be prepared by comprising Si: 10% to 12%, Mn+Cr: 1.3% to 2.0%, and a balance of Fe and Al by wt % thereof.

Further, in the present disclosure, in the hot dip aluminum plated layer, a thickness ratio of the alloyed layer/diffusion layer may preferably satisfy 1.5 to 3.0.

Due to the steel composition of the base steel sheet and constitution of the plated layer as mentioned above, the HPF part of the present disclosure can prevent defects such as detachment of the plated layer during hot forming thereby improving powdering resistance.

Next, a method of manufacturing the HPF part having excellent powdering resistance during hot press forming will be described.

First of all, in the present disclosure, a steel sheet having the steel composition as mentioned above is prepared. In the present disclosure, as the steel sheet, a cold rolled steel sheet as well as a hot rolled steel sheet can be used.

Specifically, as the steel sheet, a scale removed hot rolled steel sheet, or a cold rolled steel sheet obtained after cold rolling the hot rolled sheet can be used. And at this time, as the cold rolled steel sheet, a case of cold rolling the hot rolled steel sheet and then annealing thereof at an atmosphere of reducing gas of 750° C. to 850° C. is also included.

Then, in the present disclosure, hot dip aluminum plating is conducted by heating the steel sheet at a temperature of 550° C. to 850° C. followed by being maintained at 640° C. to 680° C., and then immersing the steel sheet in a hot dip aluminum plating bath prepared by comprising Si: 9% to 11%, Fe: 3% or less, and a balance of Al and other inevitable impurities by wt %.

Namely, in the present disclosure, for hot dip aluminum plating, the steel sheet is inserted into a heating furnace and then heated. At this time, it is preferable to limit a range of a heating temperature to 550° C. to 850°. If the heating temperature of the steel sheet is less than 550° C., a temperature difference between the steel sheet and the plating bath is excessive, thereby cooling a temperature of the plating bath during hot dip plating. Thus, plating quality may be deteriorated. If the temperature is higher than 850° C., equipment may be deteriorated by the high temperature.

Then, the hot dip aluminum plating is conducted by maintaining the steel sheet at 640° C. to 680° C., and then immersing the heated steel sheet in a hot dip aluminum plating bath prepared by comprising Si: 9% to 11%, Fe: 3% or less, and a balance of Al and other inevitable impurities by wt %. If the temperature of the plating bath is lower than 640° C., uniformity of forming plated layer thickness may be deteriorated, and if the temperature is higher than 680° C., a port of the plating bath may be deteriorated by corrosion due to the high temperature.

On the other hand, in the present disclosure, it is required to prepare the hot dip aluminum plating bath composition by comprising Si: 9% to 11%, Fe: 3% or less, and a balance of Al and other inevitable impurities by wt %.

If the Si content is less than 9%, formation of the plated layer may be non-uniform, and also formation of a tau phase of the plated layer during HPF may be inadequate, thereby damaging the plated layer during pressing. On the contrary, if the Si content is greater than 11%, there is a problem of raising a managing temperature of the plating bath due to raised melting temperature of the plating bath.

Further, the Fe in the plating bath is molted from the steel sheet to the plating bath during the plating process. However, if the Fe content in the plating bath is 3% or greater, formation of an FeAl compound mass called dross in the plating bath may be easy, thereby hindering plating quality. Thus, it is required to manage the content to be less than 3%.

On the other hand, after hot dipping, a solidified structure is determined during the solidifying process, and the solidified structure has a major influence to the alloying process and formation of the tau phase during the HPF process. Thus, it is required to control the solidifying speed. After solidifying, the Al plated layer has a structure wherein an Al phase has hardness in a range of Hv 70 to 100 and a ternary FeAlSi alloyed phase has a hardness of Hv 800 to 1000. If this structure is non-uniform, it is not good to inhibit brittleness of the plated layer because the formation of the tau phase is not enough or does not have continuity during the HPF process.

As a result of being confirmed by the present inventors, if the cooling speed until the plated layer is solidified after the hot dip plating is within 15° C./s on average, the plated layer structure may be non-uniform, but if the average speed is faster than 15° C./s on average, the region where the FeAlSi alloy phase other than the Al phase does not exist in the middle of the plated layer may be uniformly controlled within 50 µm on average. If the Al phase region where the FeAlSi alloy phase is not precipitated widens in the middle of the plated layer even locally, strength of the plated layer may become non-uniform. In this case, when unwinding or cutting a coil made of a plated material before hot pressing, the operation may be difficult because of a problem that the plated layer is attached to a touch-type roll. Accordingly, it is required that the length of the region where the FeAlSi phase is precipitated in the middle of the plated layer is within 50 µm on average and not over 100 µmat maximum. More preferably, the length may be within 30 µm on average and not over 50 µmat maximum.

In order to secure this cooling speed, it is preferable to quenching the layer using steam from directly after the hot dip plating to solidification. At this time, if the plated surface is directly cooled by a metallic piece or liquid droplet other than steam, it may cause non-uniformity of the plated structure.

At this time, in the present disclosure, it is preferable to control thickness of the plated layer formed by the hot dip aluminum plating within 25 µm to 35 µm. As a result of the hot dip melting, if the thickness of the plated layer is thinner than 25 µm, it may be not enough to protect the part by the plated layer, and if the thickness is 35 µm or thicker, mechanical properties of the plated layer after heating may become brittle, thereby generating powdering in the plated layer.

Also, in the present disclosure, the hot dip aluminum plated steel sheet may be heated at a temperature of 880° C. to 930° C. followed by being maintained for a certain time to alloy the hot dip aluminum plated layer of the surface thereof. In the present disclosure, it is required to heat the hot dip plated steel sheet at a temperature of at least 880° C.

If the temperature of the plated steel sheet is lower than 880° C., uniformity of austenite of the steel structure may be deteriorated. On the contrary, if the temperature of the steel sheet is higher than 930° C., the plated layer may be thermally deteriorated.

Due to this heat treatment, the hot dip aluminum plated layer is alloyed. Namely, the hot dip aluminum plated layer consisting of a diffusion layer and a hard alloyed layer can be obtained, and the alloyed layer includes a $Fe_2A_{15}$ base phase having brittleness and a tau phase (FeAl) having softness.

In the present disclosure, preferably, the tau phase (FeAl) may exist in the alloyed layer at an area % within a range of 10% to 30%. Further, it is preferable to prepare the tau phase to contain Si of 10% or greater and Cr of 0.2% or greater by wt % thereof (remaining ingredients are Al and Fe), and it is more preferable to prepare the tau phase to contain Si: 10% to 12%, Mn+Cr: 1.3% to 2.0% and a balance of Fe and Al by wt % thereof.

Moreover, in the present disclosure, more preferably, a thickness ratio of the alloyed layer/diffusion layer in the alloyed hot dip aluminum plated layer may satisfy 1.5 to 3.0.

On the other hand, in the present disclosure, the maintaining time may preferably be managed not to be longer than 10 min.

Then, in the present disclosure, the HPF part may be manufactured by hot forming the alloyed hot dip aluminum plated steel sheet and being quenched at a temperature range of 300° C. or lower at the same time. Namely, the alloyed steel sheet is formed by a hot press forming mold whose inside is cooled by water, and the HPF processing is finished by ejecting the process part from the mold after a temperature of the steel sheet becomes 300° C. or lower. If the formed part from the mold at a temperature of the steel sheet of 300° C. or higher is ejected after hot pressing, there may be a problem of deformation by thermal stress.

Further, according to one embodiments in the present disclosure, the method may further comprise a process of cooling the heated steel sheet before hot forming the steel sheet by a mold. It was confirmed that this cooling process has an effect of inhibiting cracking of the plated layer when formed by a mold by preventing accumulation of stress on the plated layer. However, this step is just a maximized effect of the present disclosure, and therefore, it is not necessarily required to be conducted.

When cooling, the cooling speed may be preferably 20° C./s to 100° C./s. If the cooling speed is slower than 20° C./s, the cooling effect can't be expected, but if the speed is faster than 100° C./s, a martensite transformation effect by hot press may be reduced by excessive cooling.

During the cooling, a temperature of completing the cooling may preferably be 700° C. to 780° C. If the temperature of completing the cooling is lower than 700° C., the martensite transformation effect by hot press may be reduced, but if the temperature is higher than 780° C., the effect of inhibiting cracking of the plated layer by the cooling may be reduced.

Hereinafter, the present disclosure will be described in greater detail with reference to examples. However, the following examples are for illustrative purposes only, and should not be seen as limiting the scope of the present disclosure. The scope of the present disclosure should be determined by the claims and information reasonably inferable therefrom.

Example

First of all, a cold rolled steel sheet in a thickness of 1.4 mm having a composition of 0.227C-0.26Si-1.18Mn-0.014P-0.00245-0.035Al-0.183Cr-0.034 Ti-0.0023B-0.0040N by wt % was prepared, and oils and contaminants of the surface of the cold rolled steel sheet were removed by washing.

After heating the cold rolled steel sheet at 760° C., the steel sheet was immersed in a plating bath maintained at 660° C. to form a hot dip aluminum plated layer on the steel sheet. At this time, in the plating bath, other than Al, a Si content was changed to 8% to 11%, and an Fe content was evaluated within a range of 1.7% to 2.5%. Then, as described above, the plated steel sheet where the hot dip aluminum plated layer is formed was cooled, and at this time, the cooling speed of Example 1, Example 2, Example 3, Comparative Example 1, and Comparative Example 2 was controlled to 15° C./s, 35° C./s, 45° C./s, 14° C./s and 12° C./s, respectively, in the following Table 1.

Then, as shown in Table 1, the cooled plated steel sheet was inserted in a heating furnace of 900° C. to 930° C. for 5 min to 6 min followed by heating thereof, and HPF was continuously conducted. At this time, the continuous work was conducted until a width of defects made by debris detached from the plated layer on the surface of the formed part became 0.5 mm, and a number thereof became 5.

The following Table 1 shows a plating bath composition and plated layer thickness, and percentage, composition, and thickness of the tau phase after heating used in manufacturing plated steel sheets used to a press formability test, and also shows a possible continuous work number in summary. However, an absolute value of the continuous work number may vary depending on a shape and material of the mold; but in these Examples, it can be found that an increase and decrease of the continuous work number is significantly changed according to a structure and composition of the alloyed layer.

TABLE 1

| Section | Plating Bath composition (wt %) | | | Heating Temp. (° C.) | Heating Time (min) | % of Tau phase | Tau phase composition (wt %) | | | | Alloy Layer Thickness (μm) | Alloy layer/ diffusion layer ratio | Continuous Working Number |
|---|---|---|---|---|---|---|---|---|---|---|---|---|---|
| | Al | Si | Fe | | | | Al | Si | Cr | Mn | | | |
| Exam. 1 | 88.5 | 9.7 | 1.8 | 900 | 5 | 21 | 22.6 | 10.29 | 0.28 | 1.3 | 30.5 | 2.8 | 255 |
| Exam. 2 | 88.5 | 9.7 | 1.8 | 930 | 6 | 27 | 23.5 | 10.50 | 0.23 | 1.4 | 30.2 | 1.75 | 290 |
| Exam. 3 | 87.0 | 11 | 2.0 | 900 | 6 | 19 | 21.1 | 11.5 | 0.25 | 1.2 | 29.4 | 2.2 | 260 |
| Comp. Exam. 1 | 89.1 | 8.8 | 2.0 | 900 | 6 | 7.2 | 28.5 | 8.34 | 0.15 | 1.1 | 36 | 9.5 | 80 |
| Comp. Exam. 2 | 89.5 | 8.0 | 2.5 | 900 | 6 | 5.9 | 29.5 | 8.11 | 0.18 | 1.0 | 37 | 8.2 | 85 |

*In Table 1, a % of tau phase means percentage of a tau phase in an alloyed layer, and a tau phase composition means wt % thereof (a balance of Fe).

As shown in the above Table 1, in the cases of Examples 1 to 3 containing Si of 10% or greater and Cr of 0.2% or greater in the tau phase composition making the alloyed layer, it can be found that all of them have alloyed layer thickness of 35 μm or thinner and also an excellent continuous working number of 255 or more.

On the other hand, FIG. 1 is an image showing a cross section of the plated layer of Example 1 of the present disclosure. As shown in FIG. 1, it can be found that after HPF processing, the plated layer is composed of an alloyed layer and a diffusion layer, and the tau phase is shown as a dark colored region in the alloyed layer.

Figure 2:
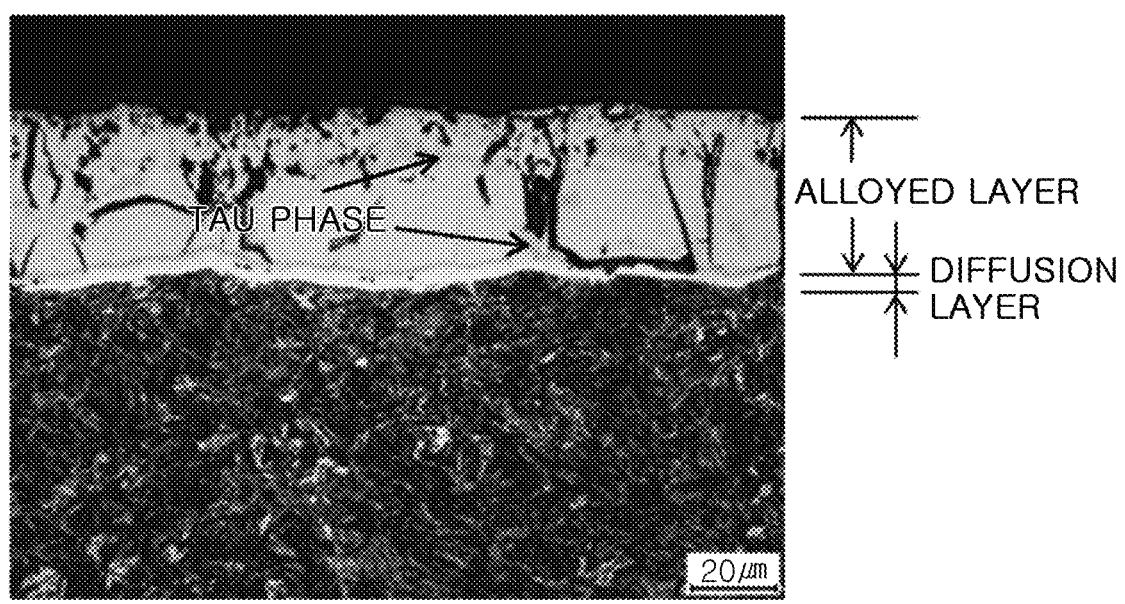
FIG. 2 is an image of a structure showing a cross section of a plated layer after hot pressing in a Comparative Example.

On the contrary, in the cases of Comparative Examples 1 and 2 containing Si of 10% or less in the tau phase composition making the alloyed layer, it can be found that both of them have alloyed layer thickness of 35 μm or greater, and a bad continuous working number of 85 or less. FIG. 2 is an image of a structure showing a cross section of the plated layer of Comparative Example 1 of the present disclosure.

While the present disclosure has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present disclosure.

What is claimed are:

1. A method of manufacturing an HPF part having an improved powdering resistance during hot press forming, the method comprising:

a process of preparing a steel sheet comprising C: 0.18% to 0.25%, Si: 0.1% to 1.0%, Mn: 0.9% to 1.5%, P: 0.03% or less, S: 0.01% or less, Al: 0.01% to 0.05%, Cr: 0.05% to 0.5%, Ti: 0.01% to 0.05%, B: 0.001% to 0.005%, N: 0.009% or less, and a balance of Fe and other impurities by wt %;

a process of heating the steel sheet at a temperature of 550° C. to 850° C. followed by being maintained at 640° C. to 680° C. to form a heated steel sheet;

a process of immersing the heated steel sheet in a hot dip aluminum plating bath for hot dip aluminum plating to form a hot dip aluminum-plated steel sheet, the hot dip aluminum plating bath comprising Si: 9% to 11%, Fe: 3% or less, and a balance of Al and other inevitable impurities by wt %;

a process of cooling the hot dip aluminum-plated steel sheet at an average cooling speed of faster than 15° C./s until a plated layer of the hot dip aluminum-plated steel sheet is solidified to form a cooled hot dip aluminum-plated steel sheet;

a process of heating the cooled hot dip aluminum-plated steel sheet at a temperature of 880° C. to 930° C. followed by being maintained for a predetermined period of time to alloy a hot dip aluminum plated layer of the cooled hot dip aluminum-plated steel sheet to form an alloyed hot dip aluminum-plated steel sheet; and a process of hot forming the alloyed hot dip aluminum-plated steel sheet and being quenched to a temperature range of 300° C. or lower simultaneously with the process of hot forming to manufacture an HPF part, wherein the alloyed hot dip aluminum-plated layer comprises: a soft diffusion layer and a hard alloyed layer; the alloyed layer comprises: $Fe_2Al_5$ matrix phase and a tau phase comprised of Fe—Al based alloy phase; in the alloyed layer, the tau phase exists at area % within a range of 10% to 30%; and the tau phase comprises: Si of 10% or greater and Cr of 0.2% or greater by wt % thereof.

2. The method of claim 1, wherein the tau phase comprises: Si: 10% to 12%, Mn+Cr: 1.3% to 2.0%, and a balance of Fe and Al by wt % thereof.

3. The method of claim 1, wherein the alloyed layer and the diffusion layer have a thickness ratio in a range of 1.5 to 3.0.

4. The method of claim 1, wherein the steel sheet is a cold rolled steel sheet or a hot rolled steel sheet.

5. The method of claim 1, further comprising: a process of cooling the alloyed hot dip aluminum-plated steel sheet to a temperature range of 700° C. to 780° C. at a cooling speed of 20° C./s to 100° C./s, before the process of hot forming.

6. The method of claim 1, wherein the steel sheet further comprises: Mo+W: 0.001% to 0.5%.

7. The method of claim 1, wherein the steel sheet further comprises: at least one of Nb, Zr, and V: within a range of 0.001% to 0.4% (as a sum).

8. The method of claim 1, wherein the steel sheet further comprises: Cu+Ni: within a range of 0.005% to 2.0%.

9. The method of claim 1, wherein the steel sheet further comprises: at least one of Sb, Sn, and Bi: 0.03% or less.

* * * * *